UNITED STATES PATENT OFFICE.

THOMAS B. GUNNING, OF NEW YORK, N. Y.

IMPROVEMENT IN PLASTIC COMPOSITIONS.

Specification forming part of Letters Patent No. 124,736, dated March 19, 1872.

Specification describing a certain new Plastic Composition, invented by THOMAS BRIAN GUNNING, of the city of New York, in the county and State of New York.

This invention relates to a new plastic composition of great value when applied to the manufacture of boxes and other useful and ornamental articles, since it is strong, durable, sufficiently elastic, beautiful in appearance, susceptible of high polish and distinct ornamentation, and impervious, practically, to air, water, and fatty substances. The composition consists, principally, of finely-powdered carbonate of lime and shellac so combined and treated as to produce the desired effect.

To one part, by weight, of good shellac—preferably the kind known in market as "Camel's"—I add two parts, by weight, of finely-pulverized marble. The ingredients should be finely powdered before mixture, then put into a suitable vessel, exposed to heat, and stirred constantly until melted into a homogeneous mass, which should then be rolled out to a suitable thickness. It can then be reheated, molded, and pressed or otherwise shaped into the desired form.

When bleached shellac is used it may be necessary to reduce the proportion of marble somewhat, as the fusibility of the shellac is generally diminished in the bleaching process.

In some instances, where a light shade is desired, pure white chalk may be used in place of the marble. I then proceed by mixing with shellac, as stated above, except that the proportions are somewhat varied—one part of bleached shellac being used to one and a half or to one and five-eighth parts of the chalk.

Different colors may be obtained by adding suitable coloring matter to the materials when first mixing. Composition containing different colors can be mixed so that the articles made from it will present a marbled appearance.

I do not wish to confine myself to pure "carbonate of lime;" but I desire also to include all matter containing the same, either more or less pure or convenient for use in this composition. For example, alabaster, travertine, agaric mineral, all the various marbles, and also the calcareous spars, such as calc-spar, Iceland spar, or as in arragonite, &c.; also the marble known as dolomite, containing carbonate of magnesia; also limestone, containing silicate of alumina or clay, or other matter, coral, &c.

The composition in some of its lighter shades will resemble ivory somewhat in appearance, strength, and elasticity; but, owing to its plastic state when heated, and to its capacity for taking color, this composition can be more frequently applied than ivory.

As the composition when complete contains carbonate of lime I prefer to call it a "calcareous composition," which will sufficiently distinguish it from other mixtures gotten up for the same purpose.

Having thus described my invention, I claim as new, and desire to secure by Letters Patent—

1. The new calcareous composition herein described.

2. The method herein described of preparing the ingredients and producing the calcareous composition.

THOS. B. GUNNING.

Witnesses:
ARMINIUS AIKIN, Jr.,
H. B. LEVY, Jr.